United States Patent
Ye et al.

(10) Patent No.: US 11,228,241 B2
(45) Date of Patent: Jan. 18, 2022

(54) VOLTAGE CONVERSION CIRCUIT AND CONTROL METHOD THEREOF

(71) Applicant: Delta Electronics (Shanghai) CO., LTD, Shanghai (CN)

(72) Inventors: Yiqing Ye, Shanghai (CN); Yuan Zhou, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 164 days.

(21) Appl. No.: 16/785,858

(22) Filed: Feb. 10, 2020

(65) Prior Publication Data
US 2020/0287472 A1    Sep. 10, 2020

(30) Foreign Application Priority Data

Mar. 8, 2019    (CN) .......................... 201910178236.7

(51) Int. Cl.
*H02M 3/00* (2006.01)
*H02M 3/335* (2006.01)
*H02M 1/00* (2006.01)

(52) U.S. Cl.
CPC .......... *H02M 3/01* (2021.05); *H02M 3/33573* (2021.05); *H02M 3/33592* (2013.01); *H02M 1/0058* (2021.05)

(58) Field of Classification Search
CPC .............. H02M 3/01; H02M 3/33592; H02M 3/33573; H02M 1/0058
See application file for complete search history.

(56) References Cited

U.S. PATENT DOCUMENTS

| 2009/0303753 A1* | 12/2009 | Fu ...................... H02M 3/33592 363/20 |
| 2012/0187107 A1 | 7/2012 | Liu et al. |

(Continued)

FOREIGN PATENT DOCUMENTS

| CN | 101488715 A | 7/2009 |
| CN | 101552557 A | 10/2009 |

(Continued)

OTHER PUBLICATIONS

Ren Ren etc., "Optimal Design for Efficiency Based on the Dead Time and Magnetizing Inductance of LLC DC Transformer" dated Oct. 31, 2014.

(Continued)

*Primary Examiner* — Jue Zhang
(74) *Attorney, Agent, or Firm* — Qinghong Xu

(57) ABSTRACT

The present disclosure provides a control method of a voltage conversion circuit. The voltage conversion circuit includes a DC voltage input terminal, a primary side switch unit, a resonant inductance, a transformer, a secondary side switch unit and a DC voltage output terminal which are electrically coupled. The resonant inductance is connected to the transformer in series. The voltage conversion circuit also includes a resonant capacitance which resonates with the resonant inductance. The control method includes: controlling switch elements in the primary side switch unit and the secondary side switch unit, so that a range of a ratio Ton/Tr of a total conduction time Ton to a resonant period Tr of the voltage conversion circuit is (0, 1.8)∪(2.7, 3.7)∪(4.8, 5.5), and a quality factor Q of the voltage conversion circuit is less than or equal to 5, that is, Q≤5. The control method provided by the embodiment of the present disclosure can reduce the conduction loss and the switching loss (Continued)

of the voltage conversion circuit, thereby improving the efficiency and reducing the cost.

20 Claims, 33 Drawing Sheets

(56) References Cited

U.S. PATENT DOCUMENTS

| | | | | |
|---|---|---|---|---|
| 2012/0275197 | A1* | 11/2012 | Yan | H02M 3/337 363/21.02 |
| 2014/0098574 | A1* | 4/2014 | Hara | H02M 3/33592 363/21.02 |
| 2016/0294294 | A1* | 10/2016 | Ye | H02M 3/33592 |
| 2020/0274452 | A1* | 8/2020 | Hergt | H02M 3/337 |

FOREIGN PATENT DOCUMENTS

| | | |
|---|---|---|
| CN | 101902129 A | 12/2010 |
| CN | 101951713 A | 1/2011 |
| CN | 101997421 A | 3/2011 |
| CN | 102738883 A | 10/2012 |
| CN | 102790533 A | 11/2012 |
| CN | 103501571 A | 1/2014 |
| CN | 104218813 A | 12/2014 |
| CN | 104917396 A | 9/2015 |
| CN | 105322785 A | 2/2016 |
| CN | 103312171 B | 4/2016 |
| CN | 103887976 B | 6/2017 |
| CN | 107370358 A | 11/2017 |
| TW | 201246774 A | 11/2012 |
| WO | 2009154489 A1 | 12/2009 |
| WO | 2012125590 A2 | 9/2012 |

OTHER PUBLICATIONS

Yungtaek Jang etc.,"New single-switch three-phase high-power-factor rectifiers using multiresonant zero-current switching" dated Dec. 31, 1998.
Sam Abdel-Rahman: "Resonant LLC Converter: Operation and Design 250W 33Vin 400Vout Design Example".
The EESR dated Jul. 17, 2020 by the EPO.

* cited by examiner

VOLTAGE CONVERSION CIRCUIT AND CONTROL METHOD THEREOF

CROSS-REFERENCE TO RELATED APPLICATIONS

This application claims the priority of CN Patent application 201910178236.7, which is incorporated herein by reference.

TECHNICAL FIELD

The present disclosure relates to the technical field of power supply circuits, and in particular, to a voltage conversion circuit and a control method thereof.

BACKGROUND

FIG. 1 shows a two-stage cascaded converter structure, which usually adopts a working mode of firstly reducing voltage and then regulating voltage. For example, the first stage converter may use a high-efficiency DC transformer to convert the input 48V bus voltage ($U_{in}$) to a lower intermediate bus voltage ($U_{ib}$) such as 4V with an efficiency of $\eta_1$, and the second stage converter may adopt a multiphase interleaved BUCK converter to supply power for a load (for example, a processor chip) by controlling output voltage $U_o$ of the BUCK converter with an efficiency of $\eta_2$.

FIG. 2 shows a typical topology of the first stage converter of the two-stage cascaded converter of FIG. 1, i.e., a LLC series resonant circuit, and FIGS. 3A to 3C are schematic views illustrating operational waveforms of the LLC circuit shown in FIG. 2. The LLC circuit shown in FIG. 2 may charge or discharge the parasitic capacitance of the primary side switch elements ($Q_1$ to $Q_4$) in the dead time ($t_2$-$t_3$, $t_5$-$t_6$ in FIG. 3A) by adjusting the magnetizing current of the transformer TI, which can realize ZVS (Zero Voltage Switching) of the primary side switch elements, and low switching loss of the switch elements; meanwhile, the primary side switch elements can realize smaller turn-off current by a mode of resonance, so that turn-off loss is reduced.

The LLC circuit operates in a series resonant mode in the primary side, and performs resonance with a current value of 0 as a central value, wherein the maximum time for transferring energy in the resonant process is a resonant period. As shown in FIG. 3A, when a switching frequency fs is smaller than the resonant frequency fr (fs<fr), the current $i_{Lr}$ on the resonant inductance $L_r$ is equal to the magnetizing current $i_{Lm}$ at the time t1, and $L_r$ and $C_r$ stop resonating, so that the resonant time of $L_r$ is at most half of the resonant period in a half period. Therefore, the time for transferring energy from the primary side to the secondary side in the half period is $t_0$-$t_1$, while no energy is transferred in $t_1$-$t_2$. Referring to three operation states in FIGS. 3A-3C, i.e., fs<fr, fs=fr, and fs>fr, the waveforms of the resonant current approaches a sine wave. However, when the switching frequency fs continues to rise, the waveform of the resonant current gradually tends from a sine wave to a triangular wave. Theoretically, with the same average current, a root mean square (RMS) value of a sine wave is 1.1 times that of a square wave, and an RMS value of a triangular wave is 1.15 times that of the square wave. Therefore, the RMS value of the resonant current it, of the LLC circuit may be higher with increased switching frequency, resulting in larger on-state loss.

In order to realize a voltage conversion circuit with high power density, the switching frequency is increased, so that the large volume of the magnetic elements can be effectively reduced, and the power density is increased. However, with the increasing of the switching frequency and the decreasing of the circuit volume, heat dissipation becomes more difficult, and thus losses of the converter need to be significantly reduced to achieve a corresponding thermal balance. However, losses of the LLC circuit shown in FIG. 2 increases with increasing of the switching frequency.

It should be noted that the information disclosed in the background section above is intended to enhance understanding of the background of the present disclosure, and therefore may include information that does not form the prior art that is already known to those skilled in the art.

SUMMARY

An object of the present disclosure is to provide a voltage conversion circuit and a control method thereof, so as to overcome, at least to some extent, a problem of large circuit loss due to a large RMS current of a resonant circuit itself caused by limitations and disadvantages of the related art.

According to an aspect of the present disclosure, a control method of a voltage conversion circuit is provided. The voltage conversion circuit includes a DC voltage input terminal, a primary side switch unit, a resonant inductance, a resonant capacitance, a transformer, a secondary side switch unit and a DC voltage output terminal which are electrically coupled. The resonant inductance is connected to the transformer in series. The control method includes:

controlling switch elements of the primary side switch unit and the secondary side switch unit, so that a range of a ratio Ton/Tr of a total conduction time Ton to a resonant period Tr of the voltage conversion circuit is (0, 1.8)U(2.7, 3.7)U(4.8, 5.5), and a quality factor Q of the voltage conversion circuit is less than or equal to 5, wherein $Q=\mathrm{SQRT}(L_r\_eqv/C_r\_eqv)/R_o$, where $L_r\_eqv$ is an equivalent resonant inductance of the voltage conversion circuit. $C_r\_eqv$ is an equivalent resonant capacitance of the voltage conversion circuit, and $R_o$ is an internal resistance of the voltage conversion circuit.

The resonant capacitance is provided between the DC voltage input terminal and the primary side switch unit or between the DC voltage output terminal and the secondary side switch unit.

According to an aspect of the present disclosure, a voltage conversion circuit is provided including:

a DC voltage input terminal, a primary side switch unit, a transformer, a secondary side switch unit and a DC voltage output terminal which are electrically coupled;

a resonant inductance and a resonant capacitance, the resonant inductance being connected to a primary winding or a secondary winding of the transformer in series, the resonant capacitance being disposed between the DC voltage input terminal and the primary side switch unit or between the DC voltage output terminal and the secondary side switch unit, and a quality factor Q of the voltage conversion circuit being less than or equal to 5; and a controller coupled to the primary side switch unit and the secondary side switch unit for controlling switch elements of the primary side switch unit and the secondary side switch unit, so that a range of a ratio Ton/Tr of a total conduction time Ton to a resonant period Tr of the voltage conversion circuit is (0, 1.8)U(2.7, 3.7)U(4.8, 5.5).

According to another aspect of the present disclosure, a control method of a voltage conversion circuit is provided.

The voltage conversion circuit includes a DC voltage input terminal, a primary side switch unit, a resonant inductance, a transformer, a secondary side switch unit, a resonant capacitance and a DC voltage output terminal which are electrically coupled. The resonant inductance is connected to a primary side winding or a secondary side winding of the transformer in series, and the resonant capacitance is disposed between the DC voltage input terminal and the primary side switch unit or between the DC voltage output terminal and the secondary side switch unit. The control method includes:

controlling switch elements of the primary side switch unit and the secondary side switch unit to ensure that a ratio Ton/Tr of the total conduction time Ton to a resonant period Tr of the voltage conversion circuit is less than or equal to 5.5, and a quality factor Q of the voltage conversion circuit is less than or equal to 2, wherein Q=SQRT(Lr_eqv/Cr_eqv)/Ro, Lr_eqv is an equivalent resonant inductance of the voltage conversion circuit, Cr_eqv is an equivalent resonant capacitance of the voltage conversion circuit, and Ro is an internal resistance of the voltage conversion circuit.

According to another aspect of the present disclosure, a voltage conversion circuit is provided, including:

a DC voltage input terminal, a primary side switch unit, a transformer, a secondary side switch unit and a DC voltage output terminal, which are electrically coupled;

a resonant inductance and a resonant capacitance, the resonant inductance being connected to a primary winding or a secondary winding of the transformer in series, the resonant capacitance being disposed between the DC voltage input terminal and the primary side switch unit or between the DC voltage output terminal and the secondary side switch unit, and a quality factor Q of the conversion circuit is smaller than or equal to 2; and a controller coupled to the primary side switch unit and the secondary side switch unit for controlling switch elements of the primary side switch unit and the secondary side switch unit, so that a range of a ratio Ton/Tr of a total conduction time Ton to a resonant period Tr of the voltage conversion circuit is less than or equal to 5.5.

It should be understood that both the foregoing general description and the following detailed description are exemplary and explanatory only, and are not intended to limit the present disclosure.

BRIEF DESCRIPTION OF THE DRAWINGS

The accompanying drawings are incorporated in and constitute part of the specification, show the embodiments of the present disclosure and are intended to explain the principle of the present disclosure together with the description. It is apparent that the accompanying drawings in the following description are only some of the embodiments of the present disclosure, and other drawings may be obtained from these accompanying drawings by those skilled in the art without any creative work.

FIG. 25 shows a full-bridge resonant circuit of one embodiment corresponding to FIG. 4C in which the primary side circuit is a full-bridge circuit and the secondary side circuit is a full-wave rectification circuit in.

DETAILED DESCRIPTION

Figure 1:
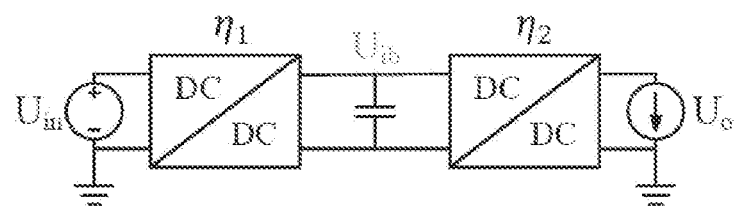
FIG. 1 is a schematic view of a two-stage cascaded converter structure.

Example embodiments will now be described more fully with reference to the accompanying drawings. However, the example embodiments can be embodied in a variety of forms, and should not be construed as limitation of the examples set forth herein; the described features, structures, or characteristics may be combined in one or more embodiments in any suitable manner. In the following description, numerous specific details are provided in order to fully understand the embodiments of the present disclosure. However, those skilled in the art will appreciate that one or more of specific details may be omitted when technical solutions of the present disclosure is implemented, or other methods, components, devices, steps, etc. may be employed. In other instances, the widely-known technical solutions will not be shown or described in detail so as to avoid obscuring various aspects of the present disclosure.

Further, the drawings are merely schematic illustrations of the present disclosure, and the same reference numbers in the drawings denote the same or similar parts, and thus a repetitive description thereof will be omitted. Some of the block diagrams depicted in the drawings are functional entities and do not necessarily correspond to physically or logically separate entities. These functional entities may be implemented in software, in one or more hardware modules or integrated circuits, or in different units and/or processor devices and/or microcontroller devices.

Exemplary embodiments of the present disclosure are described in detail below with reference to the accompanying drawings.

In order to reduce the circuit loss due to the increase of the switching frequency, reducing the conduction loss is firstly considered in the embodiment of the present disclosure.

If the conduction loss is reduced by using components with lower on-state resistances or a transformer having lower resistance, the component cost will be increased, and the volume of the transformer will be increased, so that the conduction loss is reduced by reducing the RMS current in embodiments of the present disclosure.

The switching loss also will increase with the switching frequency. Reducing the switching loss is another aspect to reduce the total circuit loss. The switching loss includes turn-on loss and turn-off loss. In order to reduce the turn-on loss, the most effective method is to realize ZVS of the switches; and in order to reduce the turn-off loss, it is necessary to reduce the turn-off current of the switches.

FIGS. 4A to 4D are schematic views of the voltage conversion circuit 400 provided by the present disclosure.

The voltage conversion circuit 400 may include:
a DC voltage input terminal 41 for receiving an input DC voltage Vin;
a primary side switch unit 42;
a transformer 43;
a secondary side switch unit 44;
a DC voltage output terminal 45 for outputting an output DC voltage Vo;
a resonant inductance Lr connected to a primary winding of the transformer 43 (FIGS. 4A, 4B) or to a secondary winding of the transformer (FIG. 4C, 4D) in series;

a resonant capacitance Cr disposed between the DC voltage input terminal 41 and the primary side switch unit 42 (FIGS. 4A, 4C) or between the DC voltage output terminal 45 and the secondary side switch unit 44 (FIGS. 4B, 4D);
a controller 46 coupled to the primary side switch unit 42 and the secondary side switch unit 44 for controlling switch elements of the primary side switch unit 42 and the secondary side switch unit 44. The controller 46 may include a plurality of sub-controllers. For example, one sub-controller controls the primary side switch unit and another sub-controller controls the secondary side switch unit, however, the present application is not limited thereto.

Figure 4A:
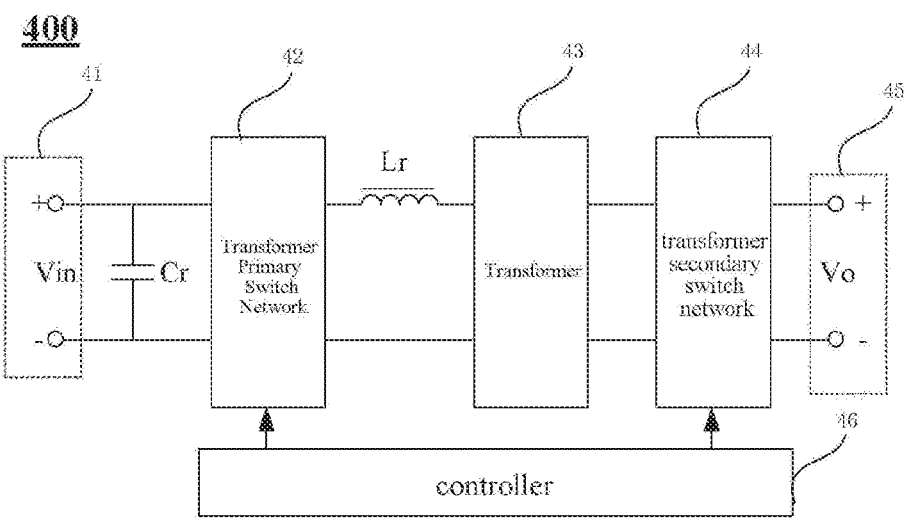
FIGS. 4A to 4D are schematic views of the voltage conversion circuit provided by the present disclosure.
Figure 4B:
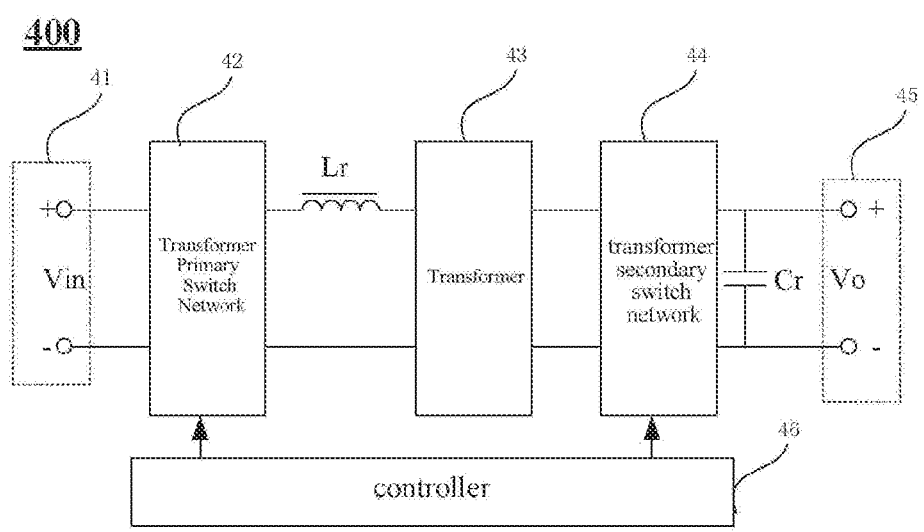
Figure 4C:
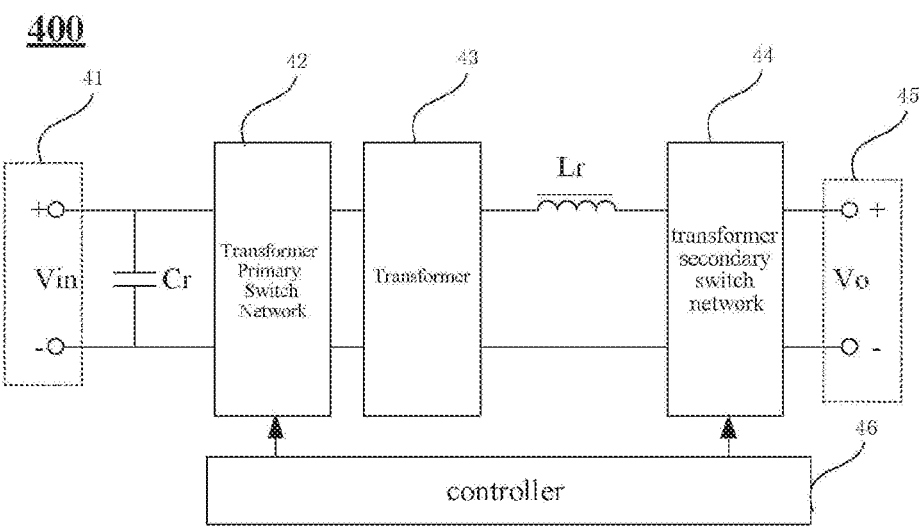
Figure 4D:
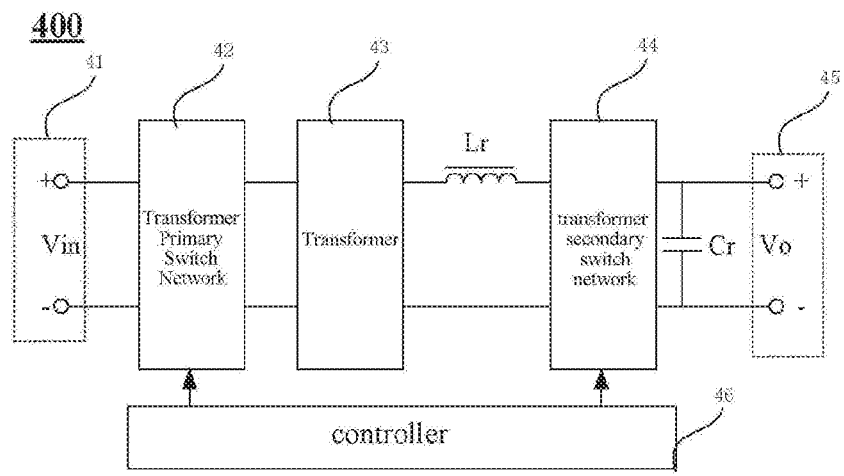
Figure 5:
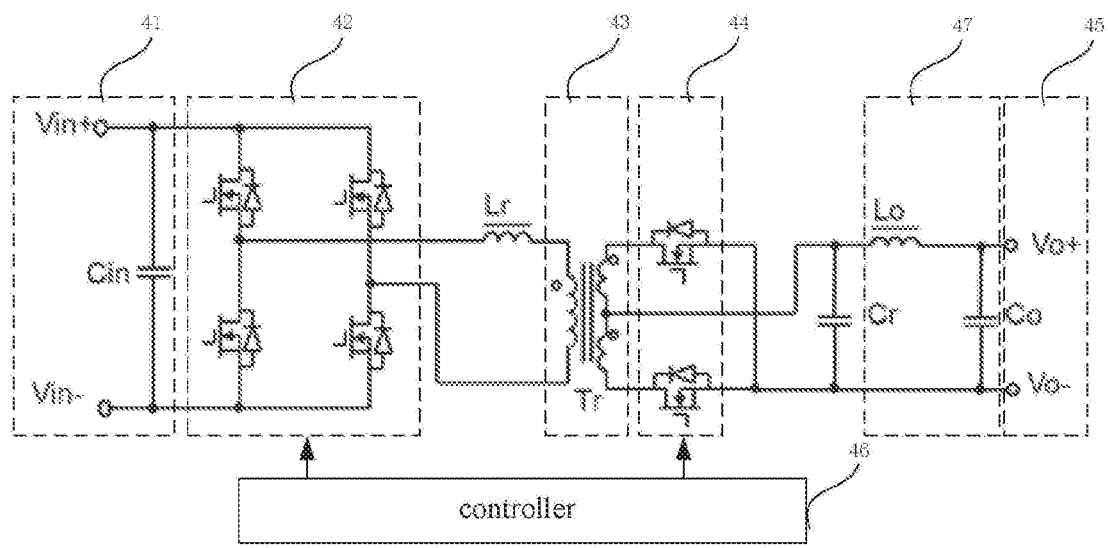
FIG. 5 shows an embodiment of the circuit shown in FIG. 4B.

FIG. 5 shows an embodiment of the circuit shown in FIGS. 4A to 4D.

In the embodiment shown in FIG. 5, the resonant capacitance Cr is disposed between the DC voltage output terminal 45 and the secondary side switch unit 44, the voltage conversion circuit may further include a filter unit 47 disposed between the resonant capacitance Cr and the DC voltage output terminal 45.

The filter unit includes, for example, a filter inductance Lo and a filter capacitance Co.

Figure 2:
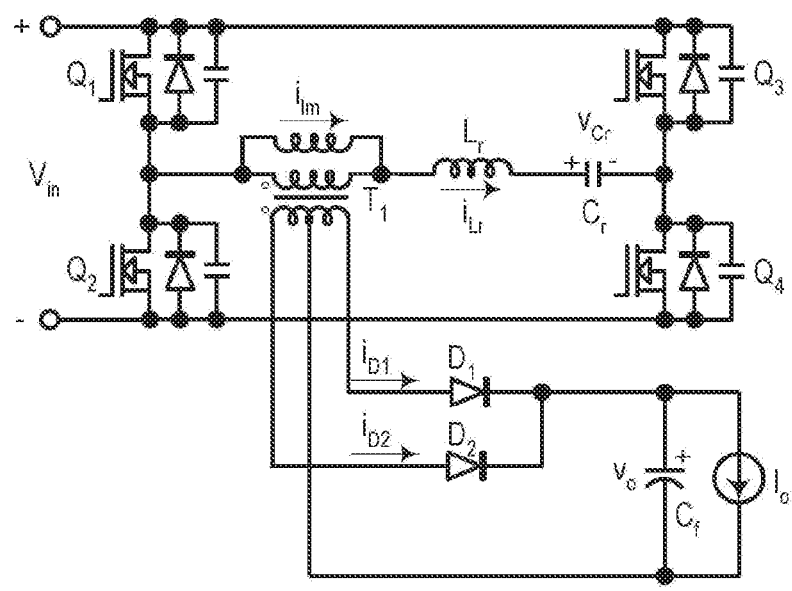
FIG. 2 is a schematic view of a typical topology of the first stage converter of the two-stage cascaded converter of FIG. 1. i.e., a LLC series resonant circuit.
Figure 3A:
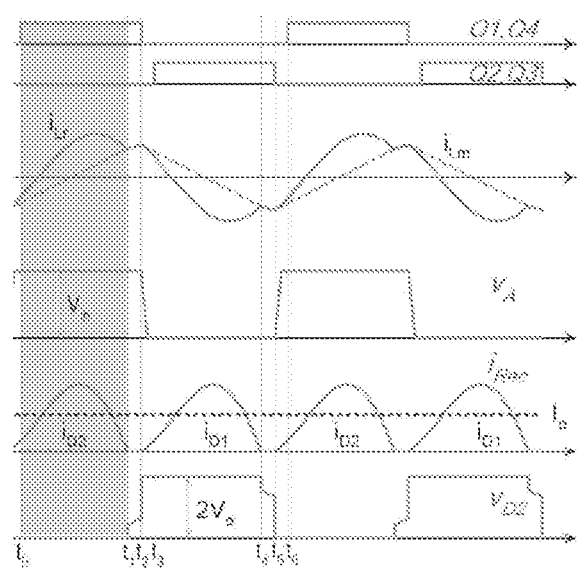
FIG. 3A is a schematic view of operational waveforms of the LLC circuit shown in FIG. 2 at a switching frequency less than a resonant frequency.
Figure 3B:
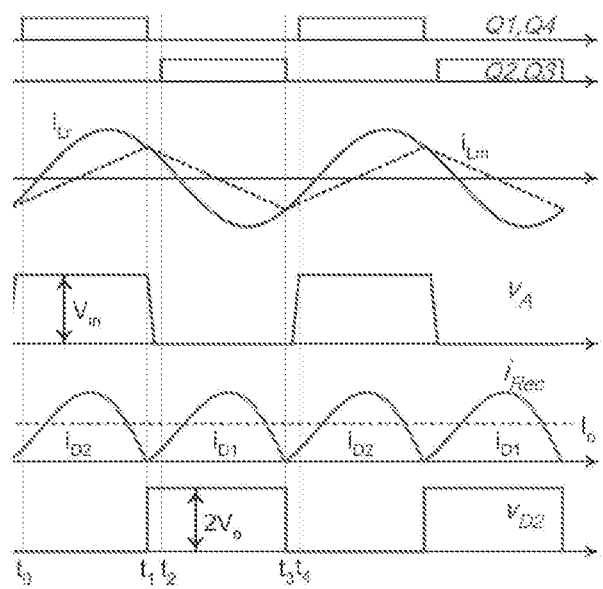
FIG. 3B is a schematic view of operational waveforms of the LLC circuit shown in FIG. 2 at a switching frequency equal to the resonant frequency.
Figure 3C:
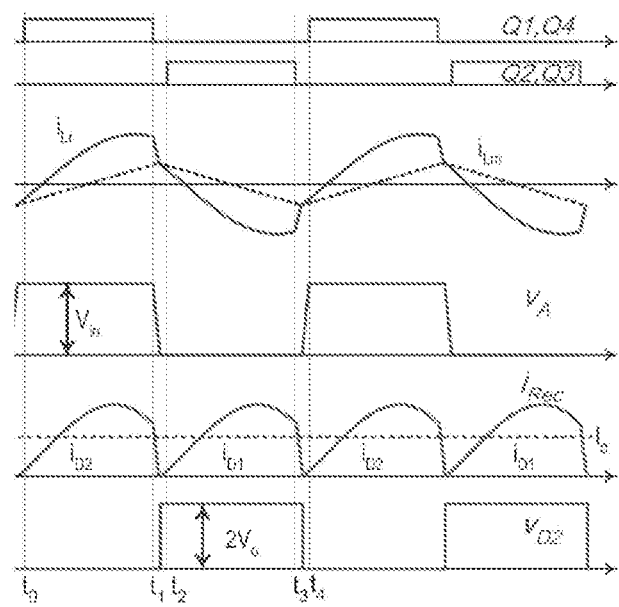
FIG. 3C is a schematic view of operational waveforms of the LLC circuit shown in FIG. 2 at a switching frequency greater than the resonant frequency.

Referring to FIG. 5, compared with the LLC circuit shown in FIG. 2, the resonant capacitance Cr of the circuit shown in FIG. 5 is not directly connected in series with the resonant inductance Lr. Rather, the resonant capacitance Cr is placed behind the secondary side switch unit. i.e., the synchronous rectification unit, and a filter unit 47 composed of a filter inductance Lo and a filter capacitance Co is further connected in series behind the resonant capacitance Cr. The filter unit 47 filters the voltage on Cr to output a final output voltage Vo. In some other embodiments, the load may be directly connected in parallel to the resonant capacitance Cr (as shown in FIG. 4B). In this circuit, the resonant inductance Lr resonates with the resonant capacitance Cr to transfer the energy. The current in Lr is an alternating current, and the synchronous rectification unit (secondary side switch unit 44) rectifies the alternating-current into a DC current with ac ripple. Since the resonant capacitance Cr and the load are connected behind and in parallel to the output of the synchronous rectification unit network, the ac part of the current flows in to the resonant capacitance Cr, and the DC part flows into the load. To further reduce the ripple voltage across Cr, i.e. the output ripple voltage, a filter unit 47 composed of a filter inductance Lo and a filter capacitance Co is added. And the filter inductance Lo and the filter capacitance Co in the filter unit will also resonate with Lr and Cr, and the influence of the filter unit on the resonant waveform is specifically determined by the values of Lr, Cr, Lo and Co. FIGS. 6A to 6D are schematic views illustrating the operation modes of the circuit shown in FIG. 5.

Figure 6A:
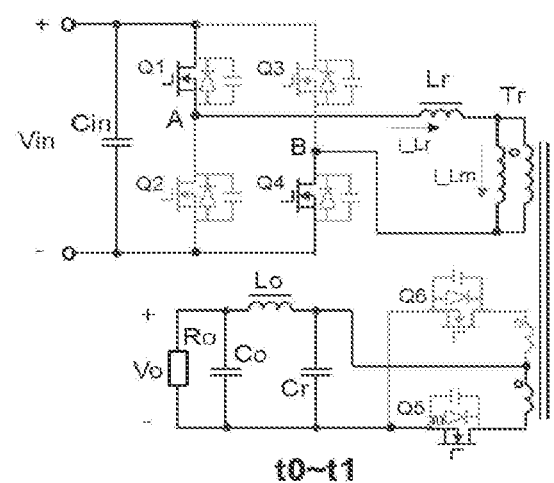
FIGS. 6A to 6D are schematic views illustrating operation modes of the circuit shown in FIG. 5.
Figure 6B:
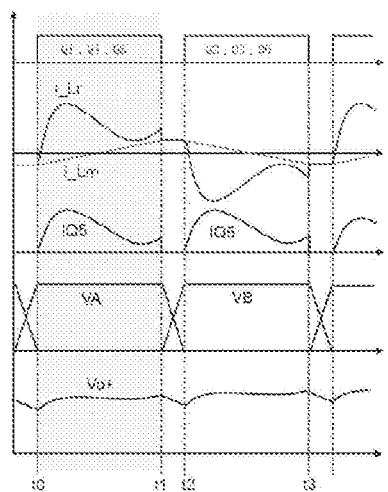

Referring to FIGS. 6A and 6B, during time t0-t1, Q1, Q4 and Q5 are turned on, a midpoint voltage VA of a midpoint A of Q1 and Q2 is equal to the DC input voltage Vin, a midpoint voltage VB of a midpoint B of Q3 and Q4 is equal to GND (i.e., 0), and a midpoint voltage VAB of two switch bridge arms of the primary side switch unit 42 is equal to Vin. The resonant inductance Lr resonates with the resonant capacitance Cr, the filter inductance Lo and the filter capacitance Co, and the resonant current i_Lr flows through the primary winding of the transformer to transmit the energy from the DC input voltage terminal to the secondary winding of the transformer, so as to generate an output voltage VCr on Cr. At this time, the voltage across a magnetizing inductance Lm of the transformer 43 is VCr*N (N is a turn ratio of the transformer), and an magnetizing current i_Lm gradually changes from a negative value to a positive value. In the case that VCr is substantially stable, i_Lm can be considered increase substantially linearly. FIG. 6B shows waveforms of the current and the voltage in FIG. 6A.

Figure 6C:
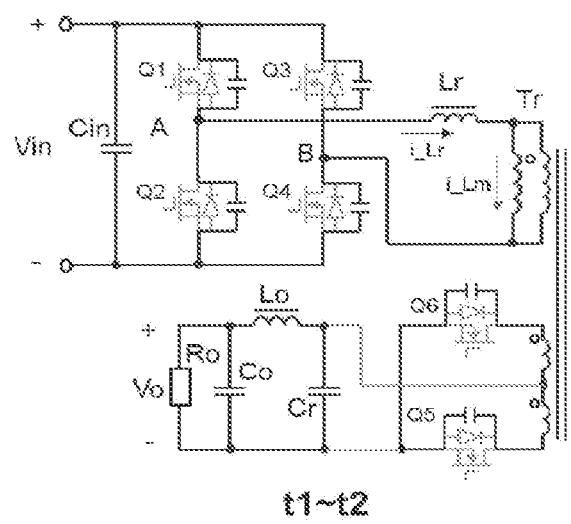
Figure 6D:
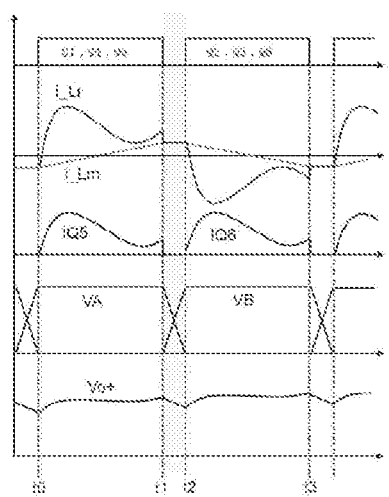

Referring to FIGS. 6C and 6D, during time t1-t2, Q1, Q4 and Q5 are turned off, the magnetizing current i_Lm charges junction capacitances of Q1, Q4 and Q5 and discharges the junction capacitances of Q2, Q3 and Q6 after the resonant current i_Lr drops to be the same as i_Lm. During this time, the midpoint voltage VA drops, and equals to 0 at t2; the midpoint voltage VB voltage rises, and equals to Vin at t2. At this time, the voltages across Q2 and Q3 are zero. Therefore, Q2 and Q3 are turned on at zero voltage at the time t2, which realize the ZVS. Thus, from t0 to t2, the half-period of operation ends. The working sequence of other half-period is similar to this half-period.

Figure 7:
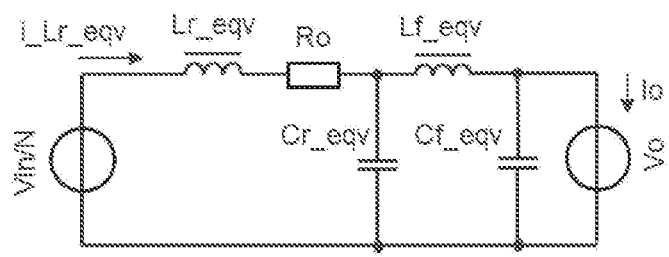
FIG. 7 is a schematic view of an equivalent circuit of the circuit shown in FIGS. 6A and 6C.

For the time from t0 to t1 shown in FIG. 6A, if Lm>>Lr or Lo, Co>>Cr, Io>>i_Lm, the topology can be simplified to an equivalent circuit as shown in FIG. 7.

In FIG. 7, Ro is the equivalent internal resistance of the voltage conversion circuit, which is an equivalent series resistance at the secondary side of the transformer, and includes an impedance of the primary side switch unit, an impedance of the secondary side switch unit such as the synchronous rectifier Q5 or Q6, an impedance of primary and secondary windings of the transformer, and a connection impedance in the circuit, etc. Lr_eqv is an equivalent resonant inductance of the circuit, which is obtained from the resonant inductance Lr equivalent to the secondary side. For example, when the resonant inductance Lr is positioned in the primary side, the equivalent resonant inductance Lr_eqv=Lr/$N^2$, where N is a turn ratio of the transformer. And, i_Lr_eqv is an equivalent resonant current of the circuit, which is obtained from the resonant current i_Lr, equivalent to the secondary side, i.e. i_Lr_eqv=i_Lr*N. And, Cr_eqv is an equivalent resonant capacitance of the circuit, and is obtained from the resonant capacitance Cr equivalent to the secondary side. When the resonant capacitance Cr is positioned on the secondary side, the equivalent resonant capacitance Cr_eqv=Cr. And Lf_eqv is an equivalent filter inductance of the circuit, which is obtained from the filter inductance equivalent to the secondary side. When the filter inductance Lo is positioned on the secondary side, Lf_eqv=Lo. And Cf_eqv is an equivalent filter capacitance of the circuit, and is obtained from the filter capacitance equivalent to the secondary side. When the filter capacitance Co is positioned on the secondary side, Cf_eqv=Co.

Figure 8:
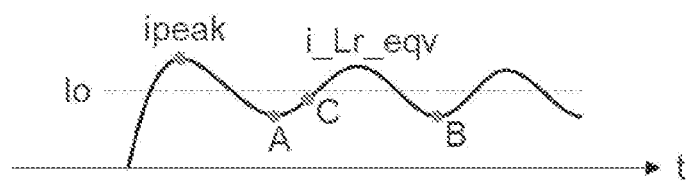
FIG. 8 is a schematic view of the waveform of the equivalent resonant current i_Lr_eqv in the equivalent circuit shown in FIG. 7.

As can be seen from the equivalent circuit shown in FIG. 7, at the time from t0 to t1 shown in FIGS. 6B and 6D, the equivalent resonant current i_Lr_eqv of the circuit is part of the output current Io. and resonates by acting Io as a central value, and the specific waveform is shown in FIG. 8.

FIG. 8 shows a schematic view of the waveform of the equivalent resonant current i_Lr_eqv.

The horizontal axis in FIG. 8 is a time axis. In the conduction state of Q1 and Q4, the equivalent resonant current i_Lr_eqv varies around the output current Io, i.e., wherein Io is the average value of the equivalent resonant current. When Q1 and Q4 are turned off at different points (i.e., the point A, B, C), the equivalent resonant current presents different waveforms. The waveform of i_Lr_eqv in FIG. 6A is obtained by turning off Q1, Q4, and Q5 at point C, and if the turn-off time of Q1, Q4, and Q5 is advanced or delayed, a different current waveform can be obtained, for example, by turning off at point A or B near the valley of the current waveform. By controlling the switch elements in the primary side switch unit and the secondary side switch unit to be turned off at different times, the resonant current can present different waveforms, and different RMS current values can be obtained under the condition of the same average current value. For example, a current valley detection circuit can be used for detecting a resonant current, when a current valley is detected, a controller controls the primary and secondary side switch elements to be turned off at the point A or the point B of the current. Because the point A/B is positioned at the valley of the current, the turn-off loss is smaller compared with other turn-off points (such as the point C).

According to the analysis in FIGS. 6A to 6D, it can be seen that the switch elements can be turned on at zero voltage as long as the magnetizing current is greater than zero. Since the equivalent resonant current i_Lr_eqv resonates around Io within a half switching period, the turn-off point may be set at any time during the half switching period after Q1, Q4 or Q2, Q3 are turned on, in which only correct direction of the magnetizing current is needed to realize zero voltage switching.

Thus, different current waveforms can be obtained by controlling the conduction time of the switch elements, and different conduction current waveforms can also be obtained by changing the resonant period of the resonant elements. As discussed above, different conduction current waveforms have different RMS current values, so the conduction time of the switches and the resonant period of the resonant elements may be simultaneously controlled to optimize the RMS current of the circuit, and thus reduce the total conduction loss of the circuit.

In the embodiment of the present disclosure, the RMS current of the switch elements and the transformer is changed (e.g., reduced) by controlling the ratio Ton/Tr of the conduction time Ton of the switch elements to the resonant period Tr, which does not affect the ZVS of the switch elements. The conduction time Ton of the switch elements refers to a duration in which the dead time is removed within one switching period, such as the time t0-t1 and t2-t3 in FIGS. 6B and 6D. The resonant period Tr refers to a resonant period collectively formed by Lr, Cr, Lo, Co, Lm, and the like in FIGS. 6A and 6C.

The resonant period Tr of the equivalent circuit shown in FIG. 7 is determined by the equivalent resonant inductance Lr_eqv and an equivalent parallel capacitance obtained by the resonant capacitance Cr_eqv in parallel with the equivalent filter unit, which includes an equivalent filter inductance Lf_eqv in series with an equivalent filter capacitance Cf_eqv. Under the condition that Lf_eqv>>Lr_eqv (for example, Lf_eqv>5*Lr_eqv), and Cf_eqv>>Cr_eqv (for example, Cf_eqv>5*Cr_eqv), the following formula is given:

$$Tr \approx 2\pi\sqrt{Lr\_eqv * Cr\_eqv} \quad (1).$$

When the resonant inductance Lr is positioned in the primary side, Lr_eqv=Lr/$N^2$, where N is the turn ratio of the primary winding to the secondary winding of the transformer; when the resonant inductance Lr is positioned in the secondary side, Lr_eqv=Lr. When the resonant capacitance Cr is positioned in the primary side, Cr_eqv=Cr*$N^2$; and when Cr is positioned in the secondary side, Cr_eqv=Cr.

Under this assumption, if the conduction time Ton keeps constant, the resonant period Tr may be adjusted to reduce the RMS value of the conduction current. The resonant period Tr may be changed by maintaining the equivalent resonant inductance unchanged under the same load condition while changing the value of the equivalent resonant capacitance Cr_eqv, or by changing the equivalent resonant inductance while maintaining the value of Cr_eqv unchanged, or by changing both. Thus, changing the ratio of Ton to Tr may result in a varying RMS current, e.g. a low RMS current.

Figure 9:
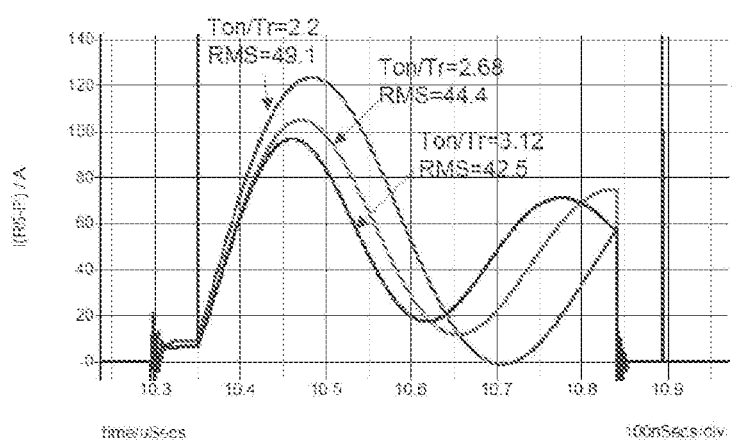
FIG. 9 shows simulated waveforms of i_Lr_eqv in FIG. 6B over a period t0-t1 under different parameter configurations.

FIG. 9 shows a series of simulated waveforms of the current IQ5 in transistor Q5 in FIG. 6B during time t0-t1 under different parameter configurations, wherein Lr_eqv/Cr_eqv=1/90000, the output current of the voltage conversion circuit Io=50 A, the switching frequency fs=900 kHz, the duty ratio Duty=90%, and the turn ratio of the transformer N=6.

In the simulation shown in FIG. 9, the conduction time Ton of the switch elements keeps constant, and different resonant periods Tr can be obtained by changing the values of Lr_eqv and Cr_eqv. It can be seen that the current waveform changes while Ton/Tr is changed, and thus the RMS value of the current are further changed. Referring to FIG. 9, as Ton/Tr changes from 2.2 to 3.12, the RMS current changes from 42.5 to 49.1. Thus, by adjusting the relationship between the conduction time and the resonant period, that is, changing the ratio of the conduction time to the resonant period, the RMS current may be reduced effectively. Therefore, the conduction loss of the circuit may be reduced, the efficiency may be improved and the cost may be further reduced.

Since the resonant period Tr is mainly determined by the equivalent resonant inductance Lr_eqv and the equivalent resonant capacitance Cr_eqv of the voltage conversion circuit, there may be an infinite number of combinations of equivalent resonant inductances and equivalent resonant capacitances with the same resonant period.

Figure 10:
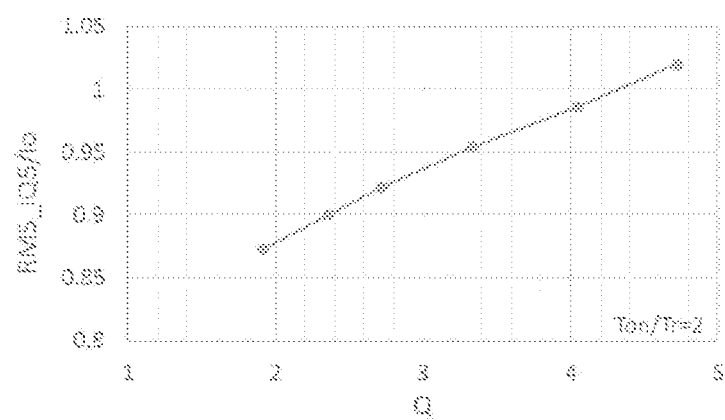
FIG. 10 is a graph showing a relationship between a ratio RMS_IQ5/Io (vertical axis) of the RMS current of the switch element Q5 to the load and the quality factor Q of the circuit.

FIG. 10 is a graph showing the relationship between the ratio RMS_IQ5/Io (vertical axis) of the RMS value of the current in switch Q5 to the load current and the quality factor Q of the circuit.

In FIG. 10, $Q=\sqrt{Lr\_eqv/Cr\_eqv}/Ro$, the switching frequency fs=900 kHz, the duty ratio of the current waveform Duty=0.9, the ratio of the conduction time of the switch elements to the resonant period Ton/Tr=2, and Io=50 A. As can be seen from FIG. 10, the larger the quality factor Q is, the larger the RMS_IQ5/Io is, and the larger the RMS current value in Q5 is, so the quality factor Q is positively proportional to the RMS current.

Figure 11:
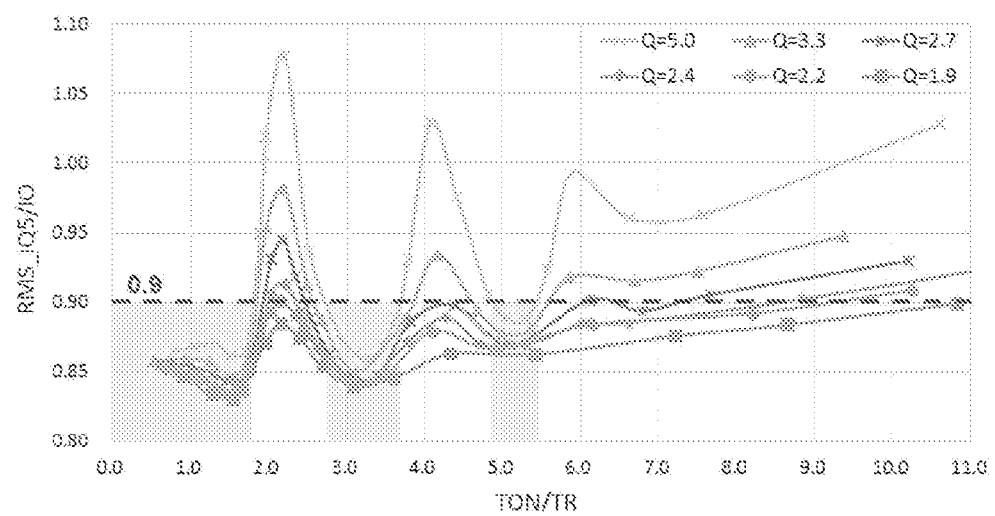
FIG. 11 is a graph showing variations of the ratio RMS_IQ5/Io of the RMS current of the switch element Q5 to the output current Io at different Q values and different Ton/Tr values.

Since both the quality factor Q and the ratio Ton/Tr affect the RMS current of the switch elements, FIG. 11 shows variation curves of the ratio RMS_IQ5/Io of the RMS current in switch Q5 to the load current with different quality factor Q values and different Ton/Tr values.

In FIG. 11, the horizontal axis represents Ton/Tr and the vertical axis represents RMS_IQ5/Io. As shown in FIG. 11, when the quality factor Q changes from 1.9 to 5.0 and the ratio Ton/Tr changes from 0.6 to 11, the ratio RMS_IQ5/Io of the current in switch Q5 to the load changes from 0.83 to 1.08, and the range of the change exceeds 30% thereof. Generally, the conduction loss is proportional to a square of the RMS value of the current, which means that the range of the change of the conduction loss is over 69%. Therefore, by selecting a proper quality factor Q value and ratio Ton/Tr, the circuit can work at a lower current, so as to obtain lower conduction loss, and further improve the circuit efficiency or reduce the requirement on elements under the same efficiency to reduce the cost.

As can be seen from FIG. 11, the current value is relatively low when Ton/Tr is around 1.6, 3.2 and 5.3 at the same quality factor Q value; and under the same ratio Ton/Tr, the smaller the quality factor Q value is, the lower the current is. For a widely used LLC resonant circuit, the ratio of the RMS current of the switch elements to the load current is around 0.9. Therefore, in order to obtain a lower current, the embodiment of the present disclosure controls the range of the ratio Ton/Tr being Ton/Tr∈(0, 1.8)U(2.7, 3.7)U(4.8, 5.5), and the symbol "U" means a union. Meanwhile, by controlling quality factor Q≤5 to realize the range of RMS_IQ5/Io<0.9. For example, when taking Q=1.9 and Ton/Tr=1.6, a conduction current that is about 9% less than the conduction current of the conventional LLC circuit can be obtained, which can reduce about 19% of the conduction loss.

In some embodiments, when Q≤5 and the range of ratio Ton/Tr is (1.5, 1.7)U(3.1, 3.3)U(5.2, 5.4), the waveform of RMS_IQ5/Io is at the valley, i.e., a relatively low value, so that the circuit may operate with lower loss. Further, when the range of the ratio Ton/Tr is (1.5, 1.7) or (3.1, 3.3) and Q≤3, the ratio RMS_IQ5/Io is lower than 0.85, and the conduction loss is reduced by 10% compared with a common LLC resonant circuit.

In addition, as seen from FIG. 11, RMS_IQ5 may take a lower RMS current value when Q≤2 and Ton/Tr≤11. That is to say, when the quality factor satisfies Q≤2, the range of ratio Ton/Tr can be set relatively wide, so that the design of the resonant inductance and the resonant capacitance is more flexible, and the influence of the inductance or the capacitance change on the current value and the overall efficiency is little. However, it is noted that when the value of ratio Ton/Tr is too large (for example. Ton/Tr>5.5), since the resonant period of the circuit is short and the resonant frequency is high, the alternating-current resistance of the conductor in the converter (such as the primary and secondary windings of the transformer, the copper in the converter for connection, etc.) increases with the resonant frequency due to the skin effect and the proximity effect. In this case, although the RMS current is low, the alternating-current resistance is large, and thus the total loss is still large. Therefore, in the embodiment of the present disclosure, it is set that Q≤2 and Ton/Tr≤5.5 to achieve the optimal effect.

In the existing LLC circuit shown in FIG. 2, in order to obtain a smaller output ripple, the output capacitance Co needs to have large capacity with more output capacitors, which will occupy a larger space and increase the cost. Further, in order to ensure the normal operation of the series resonant circuit without affecting the resonant frequency formed by Lr and Cr, Co still needs to have large capacity. In addition, in order to obtain an accurate resonant frequency to ensure accurate switching points, Cr generally needs to adopt capacitors with better temperature and voltage characteristics, such as ceramic capacitors made of C0G material, which increases the cost of the capacitance.

Compared with the conventional LLC circuit in FIG. 2, which requires more output capacitances and requires resonant capacitances with better characteristics, the embodiment shown in FIG. 5 has the advantages that the number of the resonant capacitance is greatly reduced, and that the requirements on the temperature and voltage characteristics of the resonant capacitance are relatively low since the Ton/Tr can realize low current in a wider range, and thus the cost of capacitances is greatly reduced. Similarly, the embodiment of the resonant capacitance at the input side also has the advantages of small capacitance and low cost.

In one embodiment, when the resonant inductance is composed of only the leakage inductance of the transformer and the parasitic inductance in the circuit without external inductance, the formula $Q=SQRT(L_r\_eqv/C_r\_eqv)/R_O$ may achieve the minimum value, and under which condition the lowest RMS current can be obtained by selecting Ton/Tr to be around 1.6.

Although the values of quality factor Q and Ton/Tr are determined based on RMS_IQ5/Io≤0.9 in the above embodiments, the values of Q and Ton/Tr may be determined by other preset values in practical applications, and the present disclosure is not limited thereto.

In addition, considering that the DC voltage output terminal 45 may be connected to various loads, and the load may be a post-stage converter in actual operation. In FIG. 5, for example, when a load (such as a post-stage converter) is connected to the converter, the input capacitance of the post-stage converter is connected directly in parallel with the output filter capacitance Co, so the input capacitance of the post-stage converter can be taken as part of Co. Since the post-stage converters may include various input capacitors of different levels or materials, it cannot be guaranteed that Co>>Cr. In the equivalent circuit in FIG. 7, that is, Cf_eqv>>Cr_eqv cannot be guaranteed. Therefore, different post-stage converters may change the resonant frequency of the circuit, which further causes deviation to the optimal operation point correspondingly. As discussed above, the resonant frequency of the circuit is determined by the equivalent resonant inductance Lr_eqv and an equivalent parallel capacitance obtained by the resonant capacitance Cr_eqv in parallel with the equivalent filter unit, which is composed of an equivalent filter inductance Lf_eqv in series with an equivalent filter capacitance Cf_eqv. When the filter capacitance varies, the equivalent filter inductance Lf_eqv affects the series impedance value of the equivalent filter inductance Lf_eqv, the equivalent filter capacitance Cf_eqv and the input capacitance of the post-stage converter, and further affects the resonant frequency of the circuit. In order to reduce the influence of the capacitance variation of load on the resonant frequency, the relationship between the equivalent filter inductance Lf_eqv and the equivalent resonant inductance Lr_eqv may be adjusted. For example, with Lf_eqv increased and Lr_eqv maintained, the series impedance of the filter circuit can be increased, and therefore, the equivalent capacitance obtained by connecting the series impedance and the Cr_eqv in parallel is closer to the value of the Cr_eqv itself, which will reduce the influence on the resonant frequency.

In the embodiment of the present disclosure, if Lf_eqv>5Lr_eqv can be obtained, the impedance of the filter inductance is large enough and is dominant in the total series impedance of the filter circuit, and the change of the post-stage capacitance has little effect on the total series impedance of the filter unit, so that the change of capacitance of the post-stage load has little influence on the resonant frequency of the voltage conversion circuit of the present stage.

By the control method mentioned-above, the conduction loss of the circuit can be effectively reduced. In addition, the loss of entire circuit can also be reduced by reducing the switching loss, i.e., the turn-on loss and the turn-off loss, of the switch elements.

When a suitable range of ratio Ton/Tr and quality factor Q is selected (for example, Ton/Tr ∈(0, 1.8)∪(2.7, 3.7)∪(4.8, 5.5), Q≤5), due to the sinusoidal oscillation of the resonant current, Q1, Q2 or Q3, Q4 are turned off when the current is near the valley (near two points A, B shown in FIG. 8), so the turn-off loss of Q1 to Q4 can be reduced at the same time.

For turn-on loss, the key point is to realize ZVS of the switch elements. During the time t1-t2, if Lf_eqv>>Lr_eqv, the equivalent circuit of FIG. 12 can be obtained from the modal analysis circuit in FIG. 6C, where Cp is an equivalent capacitance converted from the junction capacitance Coss1 of Q1, Q2, Q3 and Q4 to the transformer secondary side. Wherein, Q1, Q2, Q3 and Q4 are positioned in the primary side, so the equivalent capacitance Cp=Coss1*$N^2$, where N is the turn ratio of the primary to the secondary windings of the transformer; Cs is the equivalent capacitance converted from the junction capacitance Coss2 of Q5 and Q6 to the secondary side, and since Q5 and Q6 are positioned on the secondary side, Cs=Coss2.

During the time t1-t2, the amplitude of the current flowing through the magnetizing inductance Lm of the transformer changes slightly, so Lm can be regarded as a current source i_Lm. When it is further equivalent to the secondary side, Lm may be equivalent to Lm_eqv, i.e., Lm_eqv=Lm/$N^2$, wherein the value of magnetizing inductance Lm of the transformer is measured from the primary side. Because the current flowing through Lm_eqv also changes slightly, the current may be equivalent to the current source i_Lm_eqv in FIG. 12, and i_Lm_eqv=i_Lm*N.

Figure 12:
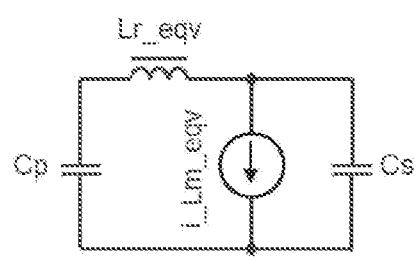
FIG. 12 is yet another equivalent circuit of the circuit shown in FIG. 6C.
Figure 13:
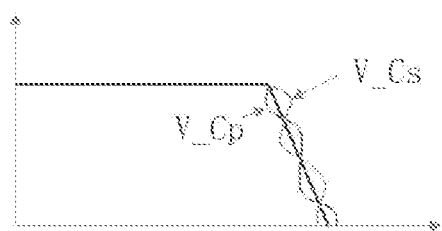
FIG. 13 is a schematic view of the resonant effect of the equivalent circuit shown in FIG. 12.

As can be seen from FIG. 12, in the process of ZVS, Lr_eqv resonates with Cp and Cs, and the initial value of the resonant current i_Lr_eqv=i_Lm_eqv. When i_Lm_eqv is determined, the amplitude of the resonance is determined by the inductance of Lr_eqv. The smaller Lr_eqv is, the smaller the amplitude of the resonant current is, and the smoother and more synchronous the voltage changes of Cp and Cs may be; the larger Lr_eqv is, the more asynchronous the voltage changes of Cp and Cs are, as shown in FIG. 13.

Figure 14:
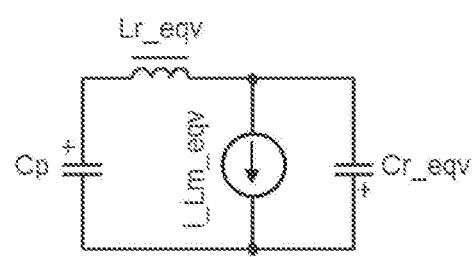
FIG. 14 is yet another equivalent circuit of the circuit shown in FIG. 6C.

As Lr_eqv introduces an oscillation, there is an asynchronization when the voltage of Cs and Cp drop to zero. From the state analysis, V_Cs generally reaches 0 before V_Cp, and once V_Cs reaches 0, the voltage on the junction capacitance of Q6 reaches 0, the diode of Q6 is turned on, and the circuit enters another mode, as shown in FIG. 14.

Since Cr_eqv>>Cs in the actual circuit, it can be regarded that i_Lm_eqv is short by Cr_eqv and cannot participate in the zero voltage switching with Cp anymore, and Cp is charged and discharged only by the energy in Lr_eqv. Meanwhile, after the voltage of Cp is superposed with that of Cr_eqv, the current in Lr_eqv is rapidly reduced, and the energy on Lr_eqv is difficult to charge and discharge Cp. Since the time for charging and discharging Cp by the actual Lr_eqv is short, it is difficult to precisely control the time to achieve ZVS. More seriously, if the value of Lr_eqv is close to the value of Lm_eqv, the current amplitude oscillating on Lr_eqv may exceed i_Lm_eqv to generate a negative current consequently, which cannot realize ZVS. Therefore, in order to ensure ZVS, it is necessary to reduce the inductance of Lr_eqv greatly, and to minimize the resonance of Lr_eqv and the parasitic capacitance during the dead time. Further, the switch elements can choose such as GaN device and the like, which is beneficial to reducing switching loss.

In one embodiment of the present disclosure, the equivalent magnetizing inductance Lm_eqv is controlled to be much larger than the equivalent resonant inductance Lr_eqv, for example. Lm_eqv/Lr_eqv>30, so that the energy in the equivalent resonant inductance is much smaller than the equivalent magnetizing inductance in the dead time, and the energy for realizing ZVS is basically generated by the equivalent magnetizing inductance, and Cp and Cs can be charged and discharged basically synchronously, so ZVS on Cp and Cs can be achieved synchronously substantially. The threshold value of the ratio is only for reference and those skilled in the art can set a higher threshold value for the ratio.

In summary, the control method provided in the embodiment of the present disclosure can reduce the conduction loss of the voltage conversion circuit by controlling the ratio Ton/Tr and quality factor Q to reduce the conduction current. Further, the ZVS of the switch elements can be effectively realized by controlling the ratio Lm_eqv/Lr_eqv of the equivalent magnetizing inductance and the equivalent resonant inductance of the circuit to be more than 30. Further, the turn-off loss can be reduced by controlling the switch elements to interrupt the resonant current at the valley. Therefore, the voltage conversion circuit with the control method provided by the embodiment of the present disclosure is more suitable for high switching frequency operation, especially when the switching frequency is higher than 200 kHz. In addition, with the increase of the switching frequency, the volume of the transformer is greatly reduced, and the leakage inductance (which may act as a resonant inductance) of the transformer is also reduced, so that a lower quality factor Q value is easier to be realized, and a lower current is obtained.

In addition to the resonant circuit shown in FIG. 5 in which the primary side circuit is a full-bridge circuit and the secondary side circuit is a full-wave rectification circuit, the voltage conversion circuit provided by the embodiment of the present disclosure may further include other different resonant circuits (as shown in FIG. 4B) in which a resonant inductance Lr is disposed in the primary side circuit, and a resonant capacitance Cr and a filter circuit are disposed in the secondary side circuit, and may further include resonant circuits combined by different primary side circuits and different secondary side circuits, wherein the primary side circuit may include one of a full-bridge circuit, a half-bridge circuit, a forward circuit, a push-pull circuit and a push-pull forward circuit, and the secondary side circuit may include a full-wave rectification circuit, a half-wave rectification circuit or a bridge rectification circuit.

Figure 15:
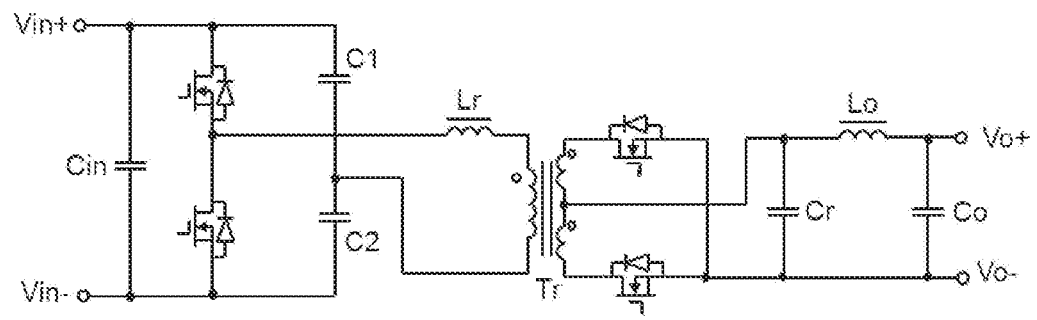
FIG. 15 shows a half-bridge resonant circuit of the embodiment of the present disclosure in which the primary side circuit is a half-bridge circuit and the secondary side circuit is a full-wave rectification circuit.

FIG. 15 shows a half-bridge resonant circuit of the embodiment of the present disclosure in which the primary side circuit is a half-bridge circuit and the secondary side circuit is a full-wave rectification circuit.

Figure 16:
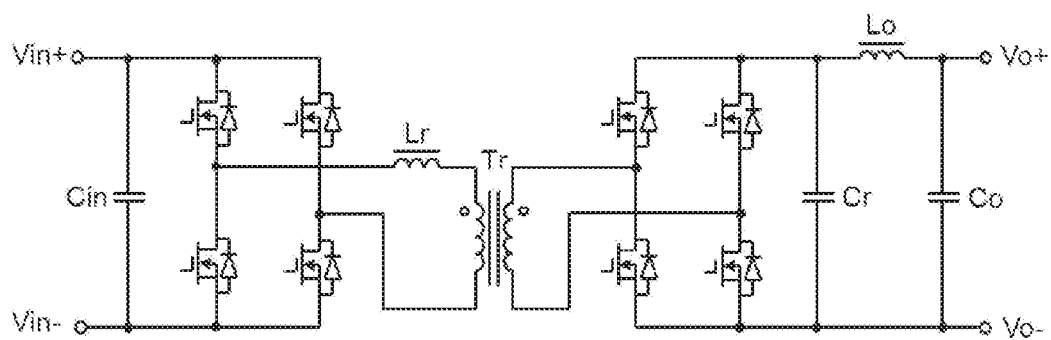
FIG. 16 shows a full-bridge resonant circuit of the embodiment of the present disclosure in which the primary side circuit is a full-bridge circuit and the secondary side circuit is a full-bridge rectification circuit.

FIG. 16 shows a full-bridge resonant circuit of the embodiment of the present disclosure in which the primary side circuit is a full-bridge circuit and the secondary side circuit is a full-bridge rectification circuit.

Figure 17:
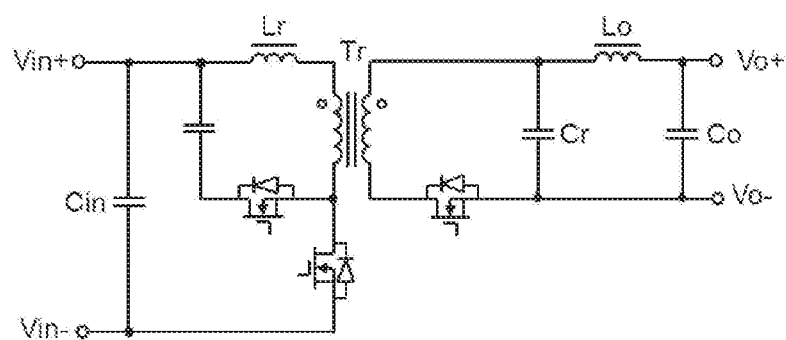
FIG. 17 shows a resonant circuit of the embodiment of the present disclosure in which the primary side circuit is an active clamp forward circuit and the secondary side circuit is a half-wave rectification circuit.

FIG. 17 shows a resonant circuit of the embodiment of the present disclosure in which the primary side circuit is an active clamp forward circuit and the secondary side circuit is a half-wave rectification circuit. In the half-wave rectification circuit, one diode (or a SR switch) is utilized to retain a half period of an alternating current, so the output voltage is about half of the input, the efficiency is low, the current fluctuation is large, and the requirement on the filter circuit is high, which is suitable for a small-current rectification circuit.

Figure 18:
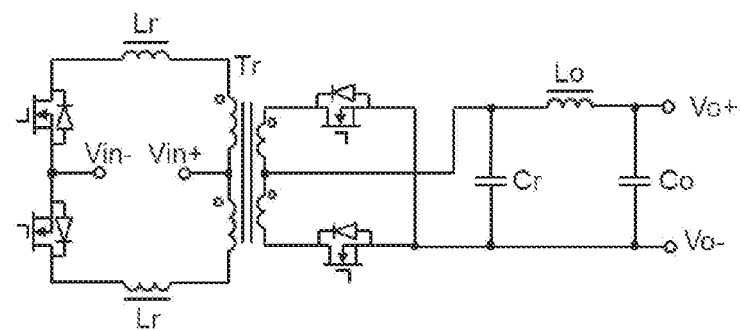
FIG. 18 shows a resonant circuit of the embodiment of the present disclosure in which the primary side circuit is a push-pull circuit and the secondary side circuit is a full-wave rectification circuit.

FIG. 18 shows a resonant circuit of the embodiment of the present disclosure in which the primary side circuit is a push-pull circuit and the secondary side circuit is a full-wave rectification circuit.

Figure 19:
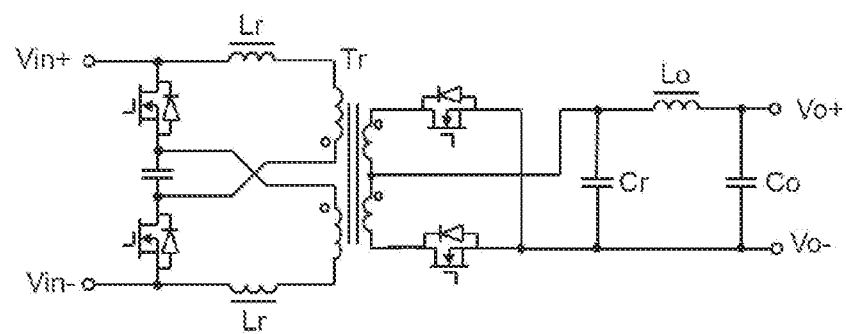
FIG. 19 shows a resonant circuit of the embodiment of the present disclosure in which the primary side circuit is a push-pull forward circuit and the secondary side circuit is a full-wave rectification circuit.

FIG. 19 shows a resonant circuit of the embodiment of the present disclosure in which the primary side circuit is a push-pull forward circuit and the secondary side circuit is a full-wave rectification circuit.

Figure 20:
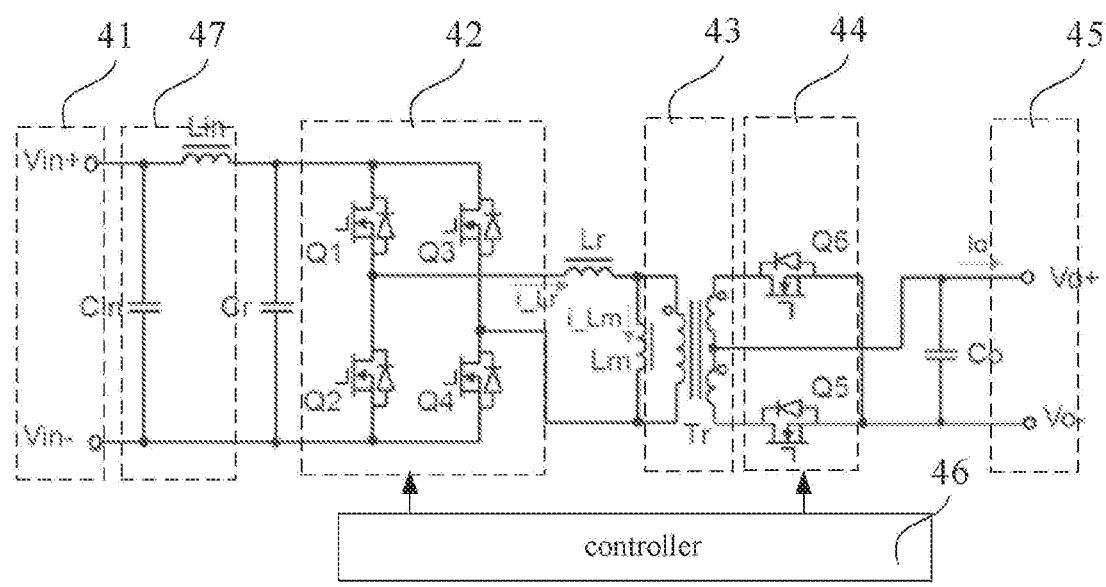
FIG. 20 is a schematic view of one embodiment of the circuit shown in FIG. 4A.

As shown in FIGS. 4A and 4C, in the voltage conversion circuit of the embodiment of the present disclosure, the resonant capacitance Cr may also be placed in front of the primary side switch unit 42, and FIG. 20 shows an example. In FIG. 20, an input filter unit consisting of a filter inductance Lin and a filter capacitance Cin is connected in series before the resonant capacitance Cr, and the resonant inductance Lr is positioned between a primary side switch unit 42 and a transformer 43. The circuit shown in FIG. 20 operates in a similar manner as above, that is, when Q1, Q4 and Q5 are turned on, the resonant inductance Lr on the primary circuit resonates with the resonant capacitance Cr, the filter inductance Lin and the filter capacitance Cin, and energy is transferred to the secondary side via the transformer 43, forming an output voltage Vo on the output capacitance Co. At this time, the resonant current also includes a DC component of the output current converted to the primary side and a component of the magnetizing current, so that i_Lr also oscillates around (Io/N+i_Lm). When Q1, Q4 and Q5 are turned off, i_Lm charges the junction capacitance of Q1, Q4 and Q5, and the junction capacitance of Q2, Q3 and Q6 is discharged simultaneously until Q2, Q3 and Q6 are turned on and enter the second half period. The operation of the second half period is similar to that of the first half period.

For a resonant circuit in which the resonant inductance, the resonant capacitance and the filter unit all at the primary circuit, the equivalent resonant inductance $Lr\_eqv=Lr/N^2$, the equivalent resonant capacitance $Cr\_eqv=Cr*N^2$ and the filter inductance $Lf\_eqv=Lin/N^2$, which are all equivalent to the secondary side. In the case where the resonant capacitance Cr is positioned on the primary circuit in FIG. 20, the resonant period Tr is determined by the resonant elements Lr and Cr, the filter elements Lin and Cin, and the transformer magnetizing inductance Lm. Under the condition that Lin>>Lr, Lm>>Lr, Cin>>Cr, the formula (1) satisfies:

$$Tr \approx 2\pi\sqrt{Lr\_eqv*Cr\_eqv} \qquad (1)$$

The quality factor Q value is also calculated by the equivalent resonant inductance Lr_eqv, the equivalent capacitance Cr_eqv and the converter internal resistance Ro converted to the secondary side, i.e., $Q=\sqrt{Lr\_eqv/Cr\_eqv}/Ro$. Similarly, the ratio Ton/Tr∈(0, 1.8)U(2.7, 3.7)U(4.8, 5.5) and quality factor Q≤5 is set to achieve lower RMS current. Especially when Ton/Tr∈(1.5, 1.7)U(3.1, 3.3) and Q≤3, the ratio of the RMS current of the switch elements to the load is less than 0.85, and the conduction loss of the circuit is reduced by 10% compared with conventional LLC resonant circuit.

When Q≤2 and Ton/Tr≤5.5, the range of the resonant period Tr can be set wider, and the design of the resonant inductance and the resonant capacitance is more flexible, and the influence of the change of the inductance or the capacitance on the current and the overall efficiency is less. Similarly, the equivalent filter inductance Lf_eqv and the equivalent resonant inductance Lr_eqv of the filter inductance and the resonant inductance equivalent to the secondary side satisfy Lf_eqv>5Lr_eqv, which can reduce the influence of capacitance change of the filter capacitance on the resonant circuit.

Similarly, when the resonant capacitance and the resonant inductance are both on the primary circuit (as shown in FIG. 4A), the voltage conversion circuit of the embodiment of the present disclosure may be a resonant circuit formed by combining different primary circuits and different secondary circuits, wherein the primary circuit includes a full-bridge circuit, a push-pull circuit, or a push-pull forward circuit, and the secondary circuit includes a full-wave rectification circuit or a bridge rectification circuit.

Figure 21:
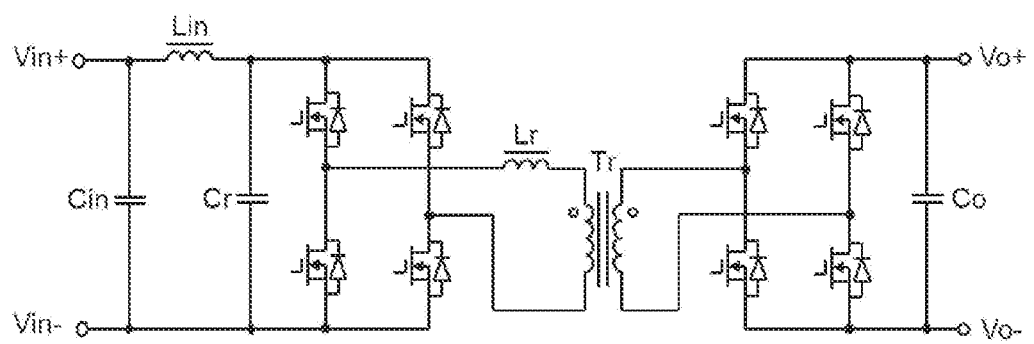
FIG. 21 shows a resonant circuit of the embodiment of the present disclosure in which the primary side circuit is a full-bridge circuit and the secondary side circuit is a full-bridge rectification circuit.

FIG. 21 shows a resonant circuit of the embodiment of the present disclosure in which the primary side circuit is a full-bridge circuit and the secondary side circuit is a full-bridge rectification circuit.

Figure 22:
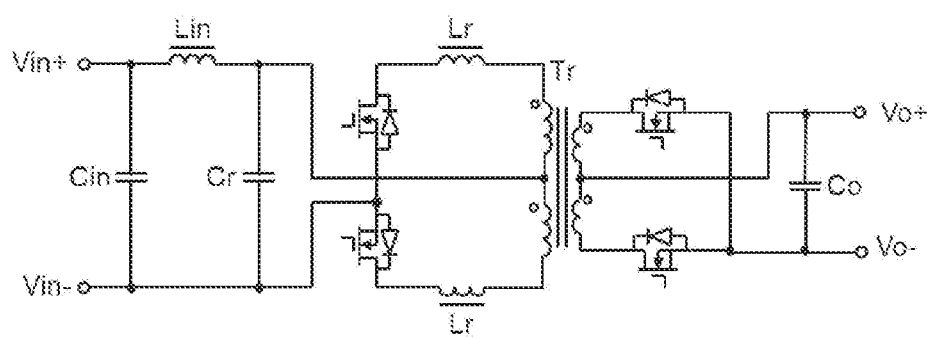
FIG. 22 shows a resonant circuit of the embodiment of the present disclosure in which the primary side circuit is a push-pull circuit and the secondary side circuit is a full-wave rectification circuit.

FIG. 22 shows a resonant circuit of the embodiment of the present disclosure in which the primary side circuit is a push-pull circuit and the secondary side circuit is a full-wave rectification circuit.

Figure 23:
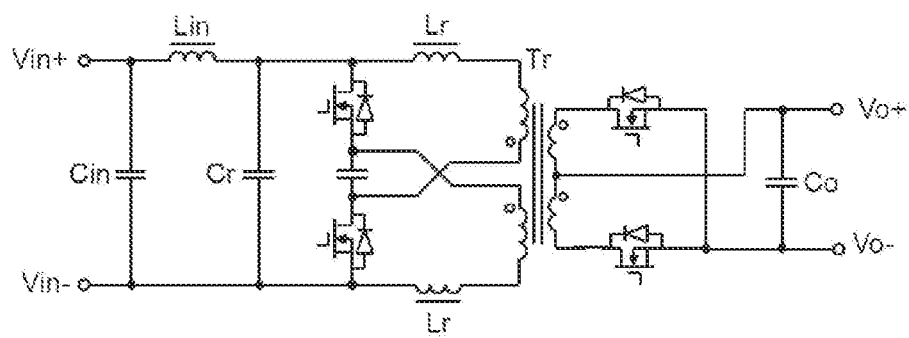
FIG. 23 is a resonant circuit of the embodiment of the present disclosure in which the primary side circuit is a push-pull forward circuit and the secondary side circuit is a full-wave rectification circuit.

FIG. 23 shows a resonant circuit of the embodiment of the present disclosure in which the primary side circuit is a push-pull forward circuit and the secondary side circuit is a full-wave rectification circuit.

When the voltage conversion circuit includes a filter circuit, the filter circuit and the resonant capacitance are generally positioned on the same side of the transformer, i.e., the resonant capacitance and the filter circuit may be positioned both on the primary side or both on the secondary side. In practice, the resonant inductance may be positioned on the primary side (as shown in FIGS. 4A and 4B) or on the secondary side (as shown in FIGS. 4C and 4D), no matter which side the resonant capacitance is positioned.

Like the extended embodiments of FIGS. 4A and 4B, when the filter inductance is positioned on the secondary side, the primary side switch unit may include one of a full-bridge circuit, a half-bridge circuit, a forward circuit, a push-pull circuit, and a push-pull forward circuit; and the secondary side switch unit may include a full-wave rectification circuit, a half-wave rectification circuit or a bridge rectification circuit.

Figure 24:
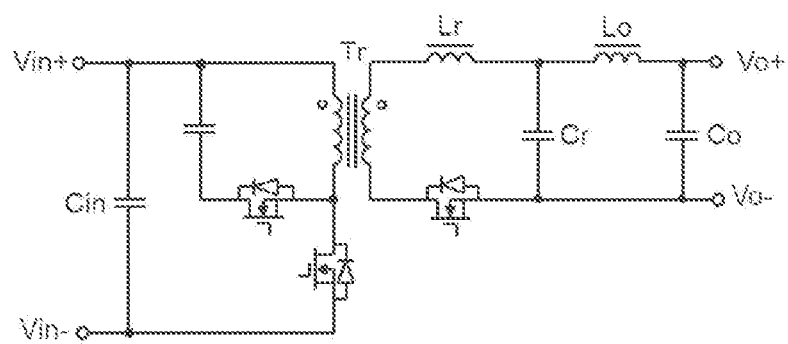
FIG. 24 shows a resonant circuit of one embodiment corresponding to FIG. 4D in which the primary side circuit is an active clamp forward circuit and the secondary side circuit is a half-wave rectification circuit.

FIG. 24 shows a resonant circuit of one embodiment corresponding to FIG. 4D in which the primary side circuit is an active clamp forward circuit and the secondary side circuit is a half-wave rectification circuit.

Figure 25:
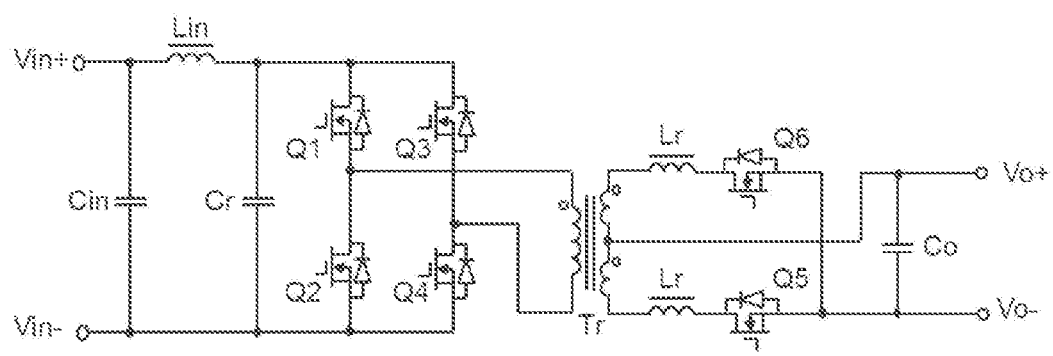

FIG. 25 shows a full-bridge resonant circuit of one embodiment corresponding to FIG. 4C in which the primary side circuit is a full-bridge circuit and the secondary side circuit is a full-wave rectification circuit.

For the resonant circuit in which the resonant inductance, the resonant capacitance and the filter circuit are all located on the secondary side (as shown in FIG. 24), the equivalent resonant inductance $Lr\_eqv=Lr$, the equivalent resonant capacitance $Cr\_eqv=Cr$ and the equivalent filter inductance $Lf\_eqv=Lo$. For the resonant circuit in which the resonant inductance is on the secondary side, the resonant capacitance and a filter circuit are on the primary side (as shown in FIG. 25), the equivalent resonant inductance $Lr\_eqv=Lr$, the equivalent resonant capacitance $Cr\_eqv=Cr*N^2$ and the equivalent filter inductance $Lf\_eqv=Lin/N^2$.

In summary, the control method of the voltage conversion circuit provided by the embodiment of the present disclosure can be applied to a voltage conversion circuit with a resonant circuit, and the resonant circuit is formed by a resonant capacitance which is positioned on a primary side or a secondary side, and a resonant inductance which is positioned in the primary side or the secondary side. And further, by controlling switch elements of the primary side switch unit and the secondary side switch unit, the range of the ratio of the conduction time Ton to the resonant frequency Tr and the value of the quality factor Q of the circuit are controlled within the above range, so as to reduce the RMS current of the switch elements and the primary and secondary windings, and further reduce the conduction loss of the circuit. In addition, the equivalent filter inductance $Lf\_eqv$ and the equivalent resonant inductance $Lr\_eqv$ of the circuit are set to satisfy $Lf\_eqv>5Lr\_eqv$, so that the influence of change of the filter capacitance on the current resonant frequency can be reduced. By making the ratio of the equivalent magnetizing inductance $Lm\_eqv$ to the equivalent resonant inductance $Lr\_eqv$ of the transformer greater than 30 in the circuit design, the voltage conversion circuit can be controlled to realize better ZVS, and the turn-on loss is basically removed. Further, by controlling the switch elements of the primary side switch unit and the secondary side switch unit to be turned off when the resonant current is at the valley, the turn-off loss can also be reduced.

In conclusion, after the turn-on loss, the conduction loss and the turn-off loss are reduced, the efficiency of the voltage conversion circuit can be improved, or the selection requirement on the elements can be reduced under the same circuit efficiency, so that the cost is reduced.

Other embodiments of the present disclosure will be apparent to those skilled in the art after considering the specification and practicing the present invention disclosed herein. This application is intended to cover any variations, uses, or adaptations of the present disclosure which follow general principles of the present disclosure and include the common knowledge and customary practice in the art that are not disclosed herein. The specification and embodiments are considered to be exemplary only, while the true scope and spirit of the present disclosure is indicated by the following claims.

What is claimed is:

1. A control method of a voltage conversion circuit, wherein the voltage conversion circuit comprises a DC voltage input terminal, a primary side switch unit, a resonant inductance, a resonant capacitance, a transformer, a secondary side switch unit and a DC voltage output terminal, the resonant inductance being connected to the transformer in series, wherein the control method comprises:

controlling switch elements of the primary side switch unit and the secondary side switch unit, so that a range of a ratio Ton/Tr of a total conduction time Ton to a resonant period Tr of the voltage conversion circuit is (0, 1.8)U(2.7, 3.7)U(4.8, 5.5), and a quality factor Q of the voltage conversion circuit is less than or equal to 5, wherein $Q=SQRT(Lr\_eqv/Cr\_eqv)/Ro$, where $Lr\_eqv$ is an equivalent resonant inductance of the voltage conversion circuit, $Cr\_eqv$ is an equivalent resonant capacitance of the voltage conversion circuit, and Ro is an internal resistance of the voltage conversion circuit;

wherein the resonant capacitance is provided between the DC voltage input terminal and the primary side switch unit or between the DC voltage output terminal and the secondary side switch unit.

2. The control method according to claim 1, further comprising:

controlling the switch elements of the primary side switch unit and the secondary side switch unit so that a resonant current of the voltage conversion circuit is interrupted at a valley.

3. The control method according to claim 1, wherein the resonant capacitance is disposed between the DC voltage input terminal and the primary side switch unit, and the voltage conversion circuit further comprises a filter unit disposed between the DC voltage input terminal and the resonant capacitance; or, the resonant capacitance is disposed between the DC voltage output terminal and the secondary side switch unit, and the voltage conversion circuit comprises a filter unit disposed between the resonant capacitance and the DC voltage output terminal.

4. The control method according to claim 3, wherein the filter unit comprises a filter inductance and a filter capacitance, and a relationship between an equivalent filter inductance $Lf\_eqv$ obtained from the filter inductance and the equivalent resonant inductance Lr_eqv of the voltage conversion circuit is Lf_eqv>5 Lr_eqv.

5. The control method according to claim 1, wherein a ratio of an equivalent magnetizing inductance Lm_eqv of the transformer to the equivalent resonant inductance Lr_eqv of the voltage conversion circuit is greater than 30.

6. The control method according to claim 1, wherein the range of the ratio Ton/Tr is (1.5, 1.7)U(3.1, 3.3)U(5.2, 5.4).

7. A voltage conversion circuit comprising:
   a DC voltage input terminal, a primary side switch unit, a transformer, a secondary side switch unit and a DC voltage output terminal which are electrically coupled;
   a resonant inductance and a resonant capacitance, the resonant inductance being connected to a primary winding or a secondary winding of the transformer in series, the resonant capacitance being disposed between the DC voltage input terminal and the primary side switch unit or between the DC voltage output terminal and the secondary side switch unit, and a quality factor Q of the voltage conversion circuit being less than or equal to 5; and
   a controller coupled to the primary side switch unit and the secondary side switch unit for controlling switch elements of the primary side switch unit and the secondary side switch unit, so that a range of a ratio Ton/Tr of a total conduction time Ton to a resonant period Tr of the voltage conversion circuit is (0, 1.8)U(2.7, 3.7)U(4.8, 5.5).

8. The voltage conversion circuit according to claim 7, wherein the primary side switch unit is one of a full-bridge circuit, a half-bridge circuit, a forward circuit, a dual-transistor forward circuit, an active clamp circuit, and a push-pull circuit; and the secondary side switch unit is a full-wave rectification circuit, a full-bridge rectification circuit or a half-wave rectification circuit.

9. The voltage conversion circuit according to claim 7, wherein the resonant capacitance is disposed between the DC voltage input terminal and the primary side switch unit, wherein the voltage conversion circuit further comprises a filter unit disposed between the DC voltage input terminal and the resonant capacitance; or, the resonant capacitance is disposed between the DC voltage output terminal and the secondary side switch unit, and the voltage conversion circuit comprises a filter unit disposed between the resonant capacitance and the DC voltage output terminal.

10. The voltage conversion circuit according to claim 9, wherein the filter unit comprises a filter inductance and a filter capacitance, and a relationship between an equivalent filter inductance Lf_eqv obtained from the filter inductance and an equivalent resonant inductance Lr_eqv of the voltage conversion circuit satisfies Lf_eqv>5Lr_eqv.

11. The voltage conversion circuit according to claim 7, wherein the resonant inductance is a leakage inductance of the transformer.

12. The voltage conversion circuit according to claim 7, wherein a ratio of an equivalent magnetizing inductance Lm_eqv of the transformer to the equivalent resonant inductance Lr_eqv of the voltage conversion circuit is greater than 30.

13. The voltage conversion circuit according to claim 7, wherein the range of the ratio Ton/Tr is (1.5, 1.7)U(3.1, 3.3)U(5.2, 5.4).

14. The voltage conversion circuit according to claim 7, wherein the quality factor Q≤2.

15. A control method of a voltage conversion circuit, wherein the voltage conversion circuit comprises a DC voltage input terminal, a primary side switch unit, a resonant inductance, a transformer, a secondary side switch unit, a resonant capacitance and a DC voltage output terminal which are electrically coupled, the resonant inductance being connected to a primary side winding or a secondary side winding of the transformer in series, the resonant capacitance being disposed between the DC voltage input terminal and the primary side switch unit or between the DC voltage output terminal and the secondary side switch unit; wherein the control method comprises:
   controlling switch elements of the primary side switch unit and the secondary side switch unit to ensure that a ratio Ton/Tr of the total conduction time Ton to a resonant period Tr of the voltage conversion circuit is less than or equal to 5.5, and a quality factor Q of the voltage conversion circuit is less than or equal to 2, wherein Q=SQRT(Lr_eqv/Cr_eqv)/Ro, Lr_eqv is an equivalent resonant inductance of the voltage conversion circuit, Cr_eqv is an equivalent resonant capacitance of the voltage conversion circuit, and Ro is an internal resistance of the voltage conversion circuit.

16. The control method according to claim 15, further comprising:
   controlling the switch elements of the primary side switch unit and the secondary side switch unit so that a resonant current of the voltage conversion circuit is interrupted at a valley.

17. A voltage conversion circuit comprising:
   a DC voltage input terminal, a primary side switch unit, a transformer, a secondary side switch unit and a DC voltage output terminal, which are electrically coupled;
   a resonant inductance and a resonant capacitance, the resonant inductance being connected to a primary winding or a secondary winding of the transformer in series, the resonant capacitance being disposed between the DC voltage input terminal and the primary side switch unit or between the DC voltage output terminal and the secondary side switch unit, and a quality factor Q of the conversion circuit is smaller than or equal to 2; and
   a controller coupled to the primary side switch unit and the secondary side switch unit for controlling switch elements of the primary side switch unit and the secondary side switch unit, so that a range of a ratio Ton/Tr of a total conduction time Ton to a resonant period Tr of the voltage conversion circuit is less than or equal to 5.5.

18. The voltage conversion circuit according to claim 17, wherein the resonant capacitance is disposed between the DC voltage input terminal and the primary side switch unit, and wherein the voltage conversion circuit further comprises a filter unit disposed between the DC voltage input terminal and the resonant capacitance: or, the resonant capacitance is disposed between the DC voltage output terminal and the secondary side switch unit, and the voltage conversion circuit comprises a filter unit between the resonant capacitance and the DC voltage output terminal.

19. The voltage conversion circuit according to claim 18, wherein the filter unit comprises a filter inductance and a filter capacitance, and a relationship between an equivalent filter inductance Lf_eqv obtained from the filter inductance and an equivalent resonant inductance Lr_eqv of the voltage conversion circuit satisfies Lf_eqv>5Lr_eqv.

20. The voltage conversion circuit according to claim 18, wherein a ratio of an equivalent magnetizing inductance Lm_eqv of the transformer to the equivalent resonant inductance Lr_eqv of the voltage conversion circuit is greater than 30.

\* \* \* \* \*